US008622284B1

(12) United States Patent
Hansen (10) Patent No.: US 8,622,284 B1
(45) Date of Patent: Jan. 7, 2014

(54) DETERMINING AND RECORDING THE LOCATIONS OF OBJECTS

(75) Inventor: Zachary J. Hansen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 163 days.

(21) Appl. No.: 12/976,837

(22) Filed: Dec. 22, 2010

(51) Int. Cl.
| G06F 17/00 | (2006.01) |
| G06F 19/00 | (2011.01) |
| G06Q 30/00 | (2012.01) |
| G06Q 90/00 | (2006.01) |
| G06K 9/46 | (2006.01) |
| G06K 7/10 | (2006.01) |
| G06K 7/14 | (2006.01) |

(52) U.S. Cl.
USPC ............ 235/375; 235/385; 235/454; 382/190

(58) Field of Classification Search
USPC .................... 235/375, 385, 383, 454, 462.01, 235/462.08–462.11, 462.41, 235/472.01–472.03; 382/181, 183, 190, 382/209, 217, 218; 705/28; 361/724–727, 361/752, 790, 796; 340/572.1
See application file for complete search history.

(56) References Cited

U.S. PATENT DOCUMENTS

| 5,602,380 | A | 2/1997 | Bishay |
| 6,045,046 | A | 4/2000 | Detwiler |
| 6,305,607 | B1 | 10/2001 | Katz et al. |
| 7,298,626 | B1 * | 11/2007 | Senogles et al. ............. 361/752 |
| 7,551,849 | B1 | 6/2009 | Abad |
| 7,712,671 | B2 | 5/2010 | Cattrone et al. |
| 8,107,736 | B2 * | 1/2012 | Brown et al. ................. 382/190 |
| 2005/0010499 | A1 * | 1/2005 | Farkas et al. .................... 705/28 |
| 2006/0210115 | A1 * | 9/2006 | Nemet .......................... 382/104 |
| 2007/0095907 | A1 * | 5/2007 | Robinson et al. ............. 235/385 |
| 2007/0100713 | A1 | 5/2007 | Del Favero et al. |
| 2008/0216003 | A1 * | 9/2008 | Onishi .......................... 715/764 |
| 2008/0306787 | A1 * | 12/2008 | Hamilton et al. ................ 705/7 |
| 2010/0027894 | A1 * | 2/2010 | Dahari .......................... 382/218 |
| 2010/0086192 | A1 | 4/2010 | Grigsby et al. |
| 2011/0025504 | A1 * | 2/2011 | Lyon et al. ................. 340/572.1 |
| 2011/0047263 | A1 * | 2/2011 | Martins et al. ................ 709/224 |

* cited by examiner

Primary Examiner — Michael G Lee
Assistant Examiner — Suezu Ellis
(74) Attorney, Agent, or Firm — Baker Botts L.L.P.

(57) ABSTRACT

In certain embodiments, one or more images of a container may be received. The following may be repeated for one or more device codes of one or more devices of an image of the one or more images: locating a device code in the image; reading a device identifier from the device code; determining a device location according to the location of the device code in the image; and associating the device identifier and the device location to yield a device identifier-location association. The one or more device identifier-location associations may be stored.

22 Claims, 3 Drawing Sheets

DETERMINING AND RECORDING THE LOCATIONS OF OBJECTS

BACKGROUND

An object may have a code that can be scanned by an operator to obtain information describing the object. For example, a product may have a bar code that can be scanned to obtain the price of the product. A code may provide any suitable information about an object. For example, a bar code may provide information identifying the object, such as an object identifier. In certain situations, the object identifier may be used to record other information about the object, such as the location of the object.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

In certain situations, an object may have a code, such as a bar code, that can be scanned in order to obtain information describing the object, for example, an object identifier. In certain situations, the location of the object may be associated with the object identifier in order to record the object's location.

As an example, a computer rack may hold multiple computing devices. The computing devices may have bar codes that can be scanned in order to obtain device identifiers of the computing devices. The device identifier of a device may be associated with the device's location on the computer rack to record the location of the device.

In certain situations, manually scanning devices of computer racks may be burdensome. A computer rack may be one of multiple computer racks of a datacenter, and a datacenter may be one of multiple datacenters of a datacenter cluster. A computer rack may include 25 to 50 or even over 50 devices to be scanned. In addition, a datacenter may include 25 to 50 or even over 50 computer racks, and a datacenter cluster may include 5 to 10 or even over 10 datacenters, which increases the burden of scanning devices.

Moreover, in certain situations, scanning devices and recording locations may be subject to operator error. For example, an operator may fail to scan a code, thus failing to obtain the device identifier. In addition, devices may be required to be scanned in a certain manner in order to match the device with the correct location on a computer rack. For example, the devices of a computer rack may be required to be scanned in a particular order, such as starting at a top shelf and scanning from left to right, then moving to the shelf below the top shelf and scanning from left to right, and so on. The scanning may yield a sequence of device identifiers in an order that indicates the location of the devices in the rack. If an operator fails to scan a code or scans the codes out of an expected order, however, the locations of the devices may be incorrectly identified.

Certain embodiments of the disclosure may ease the burden of obtaining device identifiers and device locations. For example, certain embodiments receive an image of a container (such as a computer rack) that stores devices (such as computing devices). Certain embodiments locate device codes in the image, read device identifiers from the device codes, and determine device locations according to the location of the device codes in the image. Certain embodiments associate the device identifiers and the device locations and store the one or more device identifier-location associations. Certain embodiments may reduce involvement by a human operator, which may reduce human error.

Although certain examples describe a container as a computer rack and devices as computing devices, this disclosure contemplates determining locations of any suitable objects in any suitable situation. For example, the locations of products in a warehouse, components in a computer, or equipment in a box may be determined. Other examples are presented in this disclosure.

Figure 1:
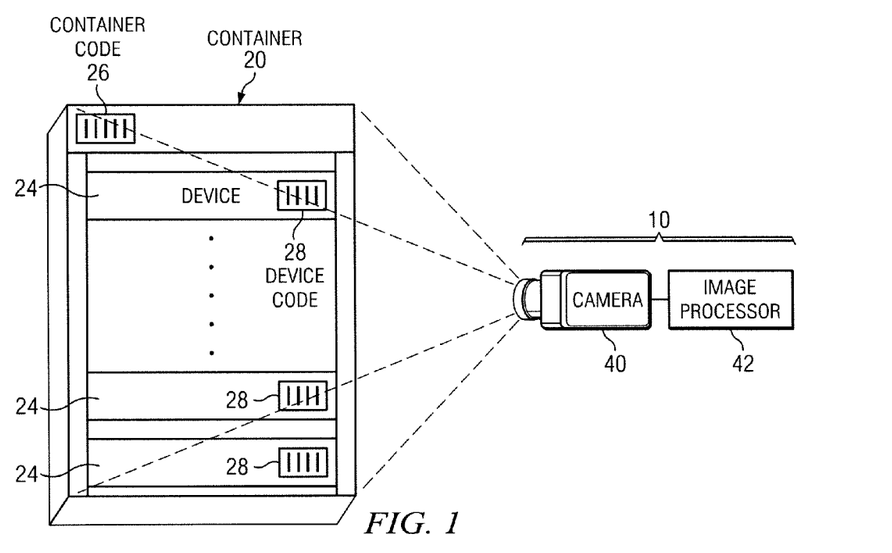
FIG. 1 illustrates an example of a system configured to determine and record locations of one or more devices in a container according to certain embodiments.

FIG. 1 illustrates an example of a system 10 configured to determine and record locations of one or more devices 24 in a container 20. In certain embodiments, system 10 captures an image of devices 24 in container 20, where devices 24 have device codes 28. For one or more device codes 28, system 10 locates a device code 28 in the image. System 10 then determines a device identifier of device 24 from device code 28 and determines a device location using device code 28. System 10 associates the device identifier and the device location to yield a device identifier-location association (such as a mapping) that records the location of device 24.

Certain embodiments of this disclosure operate on physical objects. In certain embodiments, an object may reflect and/or emit electromagnetic waves (such as visible light) such that an image may be taken of the object. Examples of objects include container 20 and devices 24, described in more detail below. In certain embodiments, objects have object identifiers that can be used to identify the objects. An identifier may include a sequence of characters. Examples of identifiers may include serial numbers, code numbers (such as manufacturer code numbers or customer requested code numbers), or other suitable identifiers.

Certain embodiments of this disclosure utilize codes that can provide information about objects, such as object identifiers. In certain embodiments, codes may include geometric patterns that can be read to provide the information. For example, a code may be a barcode that has a particular pattern of geometric shapes (such as squares, dots, polygons, bars, or other shapes) that can be optically scanned to obtain the information. In certain embodiments, codes may be read using optical character recognition.

A code may be any suitable size. In certain embodiments, the size of the code may be selected according to the size of the object and the capability to read the code. For example, the code may be small enough to be affixed to the object, but large enough to be able to be scanned and read by system 10. In certain embodiments, the code may be affixed directly to the object, but in other embodiments need not be affixed to the object.

In the illustrated example, container 20 has container code 26. Container 20 holds devices 24, which may each have device codes 28. In the illustrated example, system 10 includes a camera 40 and an image processor 42. Camera 40 and image processor 42 may communicate in any suitable manner, for example over wireless and/or wired links.

Container 20 may be a physical object that can hold other objects such as devices 24. Examples of containers 20 include containers (such as computer racks, storage and display cases, boxes, and shelving systems), buildings (such as warehouses, stores, and parking lots), products with components (such as computers, automobiles, and appliances), and other objects that can hold objects. In certain embodiments, container 20 may include regions (such as areas or volumes) where objects may be located. Examples of regions include all or a portion of any of the following: a shelf, a slot, a cabinet, a cell, a space, and other region where an object may be located.

In certain embodiments, container 20 may have a container identifier. Container 20 may have a container code 26 that may be scanned to obtain information about container 20, such as the container identifier. In certain embodiments, a container code 26 may also operate as a device code 28. The container identifiers and codes may be similar to the identifiers and codes described previously.

Container 20 may have a container location where container 20 is physically located. Container location may be expressed in any suitable manner. In certain embodiments, container location may include parameters that identify the location. For example, a computer rack located in a region G of a datacenter DC of a datacenter cluster DCC may have a container location expressed as (DCC, DC, G).

A device 24 may be any suitable physical object. Examples of devices 24 include computer equipment or computing devices (such as switches, drives, routers, servers, computing processing units, cables, and other computer equipment), products (such as consumer products), components of an object (such as ports, drives, and disks), and other objects. Device 24 may have a device identifier that identifies device 24. Device 24 may have a device code 28 that can be read to obtain information about device 24, such as the device identifier. In certain embodiments, a device code 28 may also operate as a container code 26. The device identifiers and codes may be similar to the codes and identifiers described previously.

The device location identifies the location where device 24 is located. The device location may be expressed in any suitable manner. In certain embodiments, the device location may include parameters that identify the location. For example, a computing device located in a slot S of a rack R of a datacenter DC may have a device location expressed as (DC, R, S). In certain embodiments, the device location may include all or a portion of the container identifier. For example, device location (DC, R, S) includes a portion of container location (DCC, DC, G).

In certain embodiments, a container 20 may include a first device 24 that serves as a container 20 for a second device 24. For example, a computer rack may serve as a container 20 for a computing device, which may serve as a container 20 for components within the computing device. In the embodiments, the device code 28 of the first device 24 may also operate as a container code 26.

Camera 40 captures an image of (such as photographs or images) an object by recording light reflected and/or emitted from the object. The light may be from the visible or other portion of the spectrum. Images may be still photographs or moving images such as videos or movies. Camera 40 may output image data 70 generated from the recorded light, which may be used to reproduce and/or analyze the image. In this disclosure, operations described as being performed on an image may be performed by processing image data 70. For example, a target may be located in an image by performing feature detection on image data 70. Examples of camera 40 include digital cameras such as camera phones, digital single lens reflex cameras, compact cameras, and bridge digital cameras.

Camera 40 may capture an image of container 20 in any suitable manner. For example, a human operator may operate camera 40 to capture the image. As another example, camera 40 may be mounted on a moving robotic device that automatically moves camera 40 into position and captures the image of container 20. As another example, camera 40 may be mounted in a substantially stationary manner at a location to image container 20.

In certain embodiments, image processor 42 may locate targets, such as container 20 and device codes 28, in the image. Image processor 42 may determine device identifiers from the device codes and may determine the device locations proximate to or at the location of the device code. Image processor 42 may map the device identifiers and the device locations to yield a device identifier-location associations (such as mappings). An example of image processor 42 is described in more detail with reference to FIG. 2.

Figure 2:
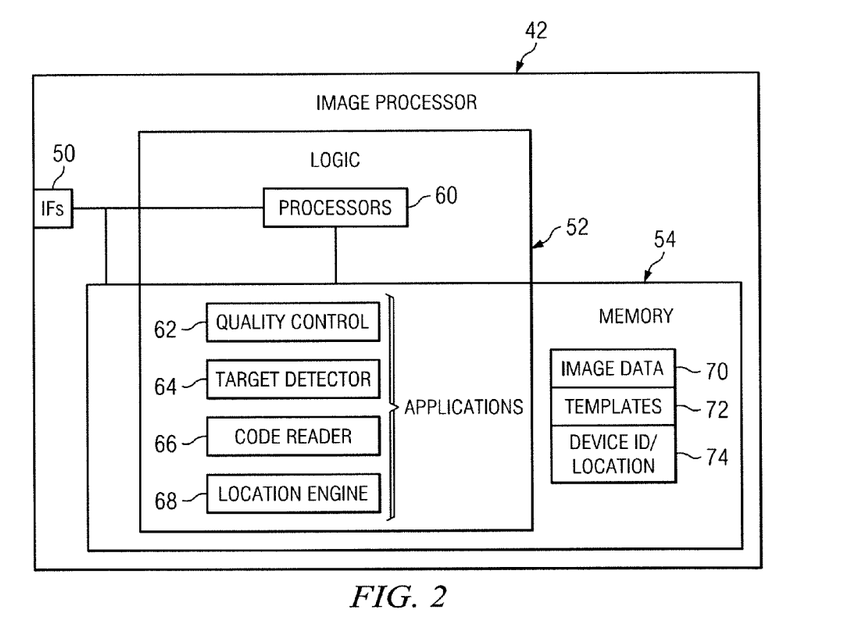
FIG. 2 illustrates an example of an image processor that may be used with the system of FIG. 1 according to certain embodiments.

FIG. 2 illustrates an example of an image processor 42 that may be used with system 10. In the example, image processor 42 includes one or more interfaces (IFs) 50, logic 52, and memory 54. Logic 52 includes one or more processors 60 and applications such as a quality control module 62, a target detector 64, a code reader 66, and a location engine 68. Memory 54 stores image data 70, one or more templates 72, and device identifier-location mappings 74.

In certain embodiments, image processor 42 receives image data 70 of an image from camera 40 and processes image data 70 to analyze the image. Image data 70 may have any suitable format. For example, image data 70 may be digital data that digitally represents an image. The digital data may be vector or raster type data.

Quality control module 62 determines whether an image is satisfactory. An image may be determined to be satisfactory in any suitable manner. In certain examples, quality control module 62 may perform prefiltering. In certain embodiments, an image may be evaluated by comparing it with a reference image that is assumed to be of satisfactory or higher quality. For example, an image of a bar code may be compared to a reference bar code image. In certain embodiments, the image may be judged according to image quality factors, which may be selected such that code reader 66 can read an identifier from a code. Examples of image quality factors include sharpness, noise, dynamic range, contrast, distortion, and/or other image quality factors that may be used to determine whether code reader 66 can read the code.

In certain examples, quality control module 62 may determine whether an image is satisfactory based on whether modules of image processor 42 (such as target detector 64, code reader 66, and/or location engine 68) can operate on the image data to provide an output. For example, if a module cannot operate on an image, quality control module 62 may determine that the image is unsatisfactory. If an image is not satisfactory, quality control 62 may request that another image of container 20 be taken. For example, image processor 42 may send a message to camera 40 indicating that the image was not satisfactory.

Target detector 64 may locate targets, such as container and device codes, in an image. Targets may be located in any suitable manner. In certain embodiments, target detector 64 may use feature detection to detect features (such as edges and corners) that are indicative of the shape and/or size of a particular target. For example, edges and corners that form a rectangular shape of a size in a particular range (such as 4 to 8, 8 to 10, 10 to 16, or greater then 16 feet$^2$) may be indicative of a container 20. As another example, edges and corners that form a rectangular shape of a size in a particular range (such as 0.25 to 0.5, 0.5 to 1, 1 to 2, 2 to 4, 4 to 8, or greater then 8 feet$^2$) may be indicative of a device 24. As another example, edges and corners that form a rectangular shape of a size in a particular range (such as less than 1 to 2, 2 to 4, 4 to 10 inch$^2$), may be indicative of a code.

Code reader 66 may read identifiers from codes, for example, a device identifier from device code 28 or a container identifier from container code 26. Code reader 66 may read an identifier from a code in any suitable manner. In certain embodiments, code reader 66 may translate code patterns in an code image to values understood by a computing system. For example, optical character recognition (OCR) may be used to translate digital images into machine-encoded text.

Location engine 68 may determine a device location with respect to the location of device code 28. The device location may be determined in any suitable manner. In certain embodiments, device code 28 may be affixed to device 24, and the device location may be assumed to be at or at least proximate to device code 28. In other embodiments, device code 28 may point to device 24 (which may or may not be located by target detector 64), and device 24 may be assumed to be in the location indicated by device code 28.

In certain embodiments, an image depicts a device code 28 and/or device 24 in spatial relation to other objects, such as container 20 or other device codes 28 and/or devices 24. The spatial relationships in an image may be used to determine the location of device 24 with respect to the other objects in the physical world apart from the image. For example, if device 24 is depicted to be on a top shelf of container 20 in an image, device 24 may be determined to be on the top shelf of container 20 in the physical world. As another example, if a first device 24 is depicted to be above a second device 24 in an image, device 24 may be determined to be above the second device 24 in the physical world.

Spatial relationships may also be used to determine the location of device 24 specified in a coordinate system. For example, a device 24 may be depicted in the image to be at (x,y) of a coordinate system based on container 20, where x measures distance from a left hand border of container 20 and y measures distance from a top border of container 20. Device 24 may then be determined to be x distance from the left hand border of container 20 and y distance from the top border of container 20 in the physical world.

Location engine 68 may express a device location in any suitable manner. For example, the device location may be expressed with respect to container 20 or other devices 24. As another example, the device location may be specified in a coordinate system that is based on container 20 or other devices 24. Examples of methods for determining and expressing device locations are described in more detail with reference to FIGS. 4A through 4C.

Continuing with FIG. 2, in certain examples, location engine 68 may use a template 72 that matches devices container 20 to determine the location of a device in container 20. A template may describe locations (or "cells") of container 20 where a device 24 could be located, but in which a device 24 might or might not be currently located. For example, a template 73 of a computer rack may describe slots, shelves, or regions of the computer rack where devices 24 could be located.

The container template 72 that matches container 20 may be identified in any suitable manner. For example, a container template 72 may include container identifiers of containers 20 that template 72 matches, so the container identifier of a particular container 20 may be used to identify a matching template 72. As another example, each container template 72 may include image features of containers 20 that the template 72 matches, so the image features of a particular container 20 may be used to identify a matching template 72.

Location engine 68 may associate (such as map) the device identifiers and the device locations to yield device identifier-location associations (such as mappings). The device identifier-location mapping 74 of a device may be used to determine the location of the device, given the device identifier. The device identifier-location mapping of a device may also be used to determine the device identifier of the device, given the device location.

For example, location engine 68 may receive a request for the location of a device with a given device identifier. Location engine 68 may determine the device location from a device identifier-location mapping for the given device identifier and may report the device location. In addition, location engine 68 may receive a request for the device identifier of a device at a given location. Location engine 68 may determine the device identifier from a device identifier-location mapping for the given location and may report the device identifier.

Location engine 68 may convert the device location from a stored format to another format to report the location to a user. For example, the device location may be stored as expressed in a coordinate system, but may be converted to a location with respect to container 20 or other devices 24 to report to a user. Examples of ways to represent and convert device locations are described in more detail with reference to FIGS. 4A and 4B.

Figure 3:
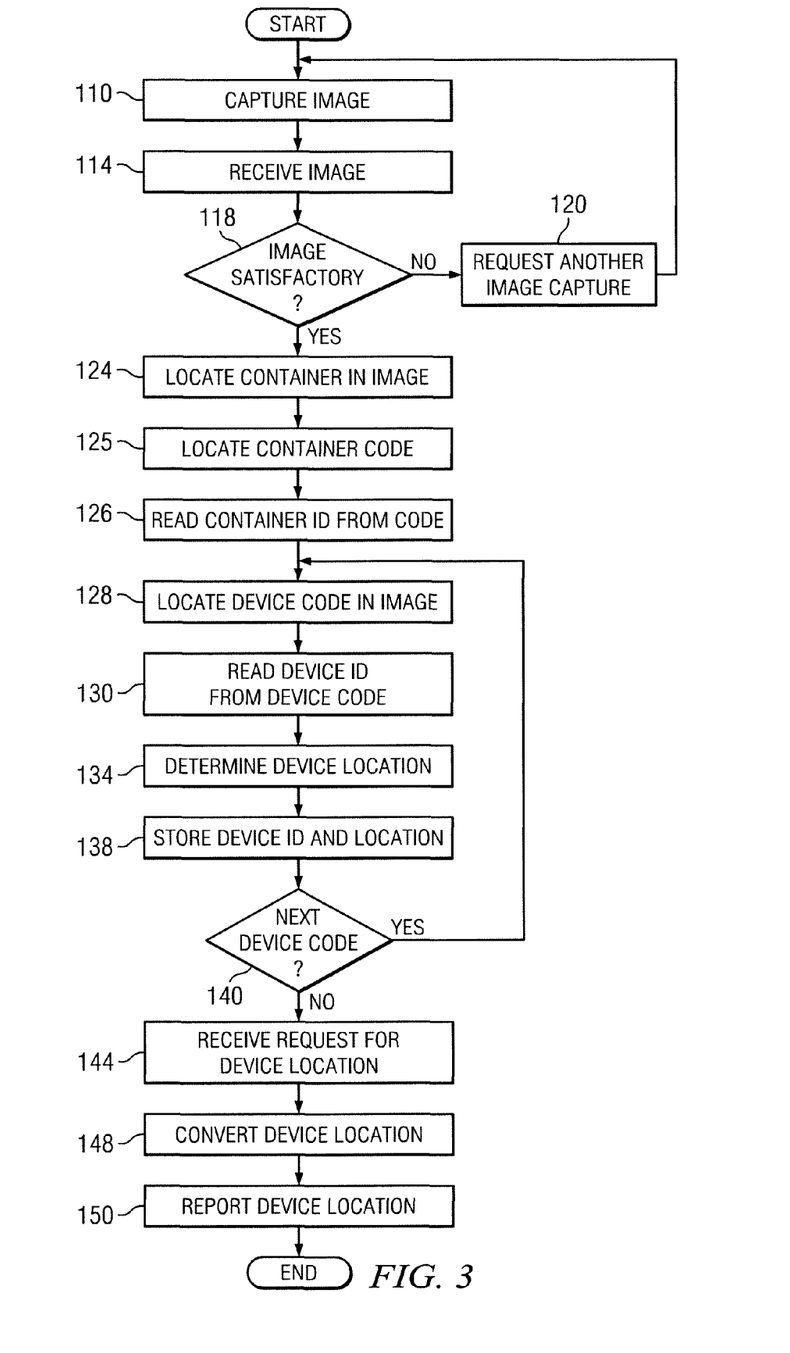
FIG. 3 illustrates an example of a method of determining and recording locations of one or more devices in a container according to certain embodiments.

FIG. 3 illustrates an example of a method of determining and recording locations of one or more devices 24 in a container 20. In certain embodiments, the method may be computer-implemented and/or may be performed by system 10.

The method starts at step 110, where an image is captured. The image may be captured in any suitable manner. In certain embodiments, camera 42 takes a digital photograph of container 20 and sends image data 70 to image processor 42. Camera 42 may also send a camera identifier that identifies camera 40 sending image data 70. The image is received at step 114.

The image may be satisfactory at step 118. For example, quality control 62 may determine whether the image is satisfactory. If the image is not satisfactory, the method proceeds to step 120, where another image capture is requested. For example, quality control 62 may send a message to camera 40 identified by camera identifier requesting that another image be taken. If the image is satisfactory at step 118, the method proceeds to step 124.

In certain embodiments, quality control 62 may operate at one or more steps of steps 124 through 134. If a module (such as target detector 64, code reader 66, and/or location engine 68) cannot operate on the image to provide an output, quality control 62 may determine that the image is unsatisfactory and request that another image be taken.

Container 20 may be located in the image at step 124. Container 20 may be located in any suitable manner. For example, target detector 64 may use feature detection to locate container 20. Container code 26 is located in the image at step 125. Container code 26 may be located in any suitable manner. For example, target detector 64 may use feature detection to locate container code 26. The container identifier may be read from the container code at step 126. In certain embodiments, the container identifier may be used to locate a template 72 that describes cells of container 10. In certain embodiments, step 125 and 126 may be performed to identify a template 72, and step 124 may be omitted.

Steps 128 through 140 may be repeated for one or more device codes 28 of the image. A device code 28 is located in the image at step 128. Device code 28 may be located in any suitable manner. For example, target detector 64 may locate device code 28 using feature detection. The device identifier is read from device code 28 at step 130. The device identifier may be read in any suitable manner. For example, code reader 66 may read the device identifier from device code 28.

Figure 4A:
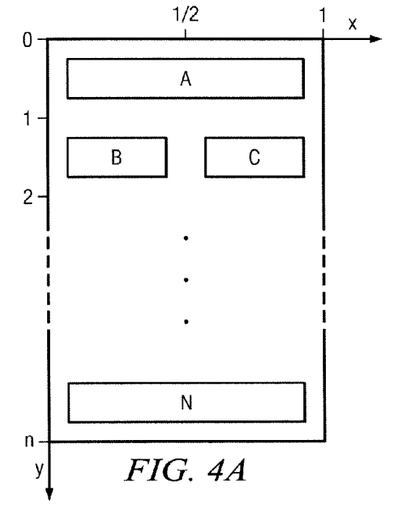
FIGS. 4A through 4C illustrate examples of methods of determining and expressing a device location according to certain embodiments.
Figure 4B:
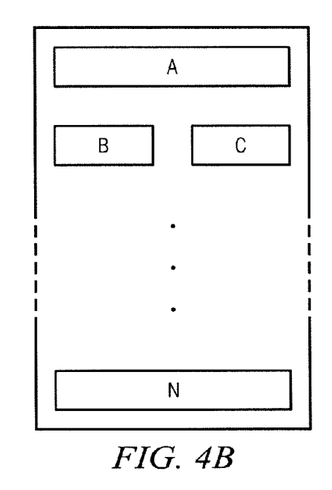
Figure 4C:
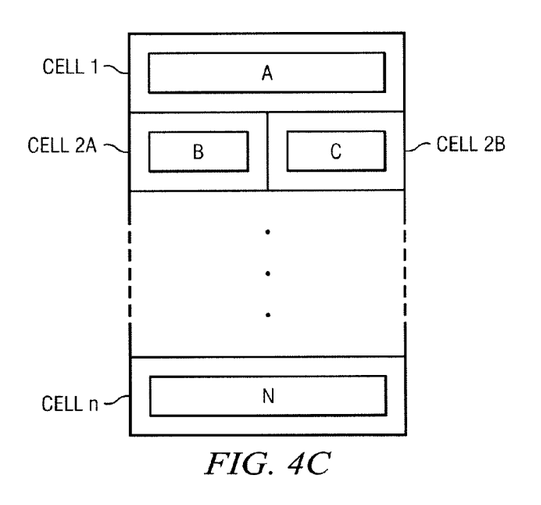

The device location is determined at step 134. In certain embodiments, location engine 68 may determine the device location in any suitable manner. FIGS. 4A through 4C describe examples of determining the device location. The device identifier and location are stored at step 138. The device identifier may be mapped to the device location as a device identifier-location mapping. The device identifier-location mapping 74 may be used to determine the location of a device given the device identifier, or may be used to determine the device identifier of a device, given the device location.

There may be a next device code 28 in the image at step 140. If there is a next device code 28, the method returns to step 128 to locate the next device code 28. If there is no next device code 28 in the image, the method proceeds to step 144.

A request for a device location may be received at step 144. The request may be received in any suitable manner. For example, a user may send a request for a device location that may include a device identifier. Location engine 68 may use a device identifier-location mapping 74 to determine the device location given the device identifier. The device location may be converted at step 148 to a format that may be reported. The converted device location is reported at step 150. In certain embodiments, interface 50 may be used to report the device location. The method then ends.

FIGS. 4A through 4C illustrate examples of methods of determining and expressing the device location. The illustrated examples show images of container 20 (with rack identifier R) with devices 24 (with device identifiers A, B, C, . . . , N). In the examples, rack R is located in datacenter DC.

FIG. 4A illustrates an example of determining and expressing a device location in a container coordinate system based on container 20. A container coordinate system may be defined with respect to container 20 by mapping an origin and coordinate axes to parts of container 20. In the illustrated example, the origin of the coordinate system is mapped to an upper left-hand corner of container 20. A x-axis is mapped to a top border of container 20, and a y-axis is mapped to a left-hand side border of container 20. The units of the x axis may be the width of container 20, and the units of the y axis may be a rack unit (U), which may be 1.75 inches.

In the example, a device location may be expressed as (DC, R, x, y). In the example, the device locations may be expressed as:

Device A: (DC, R, 0, 1)
Device B: (DC, R, 0, 2)
Device C: (DC, R, ½, 2)
Device N: (DC, R, 0, n)

FIG. 4B illustrates an example of determining and expressing a device location with respect to a particular device 24. In certain embodiments, the device location may be determined with respect to an origin device coordinate system based on a device 24 designated as an origin device. In the illustrated example, device A is selected as the origin device. The device locations of the devices may be expressed as:

Device A: (DC, R, 0, 0)
Device B: (DC, R, first device under device A, left hand side of A)
Device C: (DC, R, first device under device A, right hand side of A)
Device N: (DC, R, nth device under device A)

FIG. 4C illustrates an example of determining and expressing a device location using container cells of container 20. A container cell may be a region of container 20 in which a device 24 could be located. A cell may have a cell identifier that may be used as the device location. In certain embodiments, container template 72 that matches container 20 may be used to determine the layout of the container cells.

In the illustrated example, template 72 of rack R may describe the layout of cells 1 through n. The device locations may be:

Device A: (DC, R, cell 1)
Device B: (DC, R, cell 2A)
Device C: (DC, R, cell 2B)
Device N: (DC, R, cell n)

In certain embodiments, the device location may be converted from one representation to another representation. For example, the device location may be converted from a location expressed in a coordinate system to a location expressed with respect to another device 24 or container 20. In certain embodiments, the device location may be stored in one representation and then converted to another representation for presentation to a user.

A location may be converted in any suitable manner, for example, by applying a conversion function (such as a mathematical function) to the location to yield a converted location. In certain embodiments, device locations expressed as coordinates in a coordinate system may be converted to device locations relative to other devices. For example, in the coordinate system of FIG. 4A, a device with y=k may be under a device with a y=k−1 and above a device with a y=k+1. A device with a lower x value may be to the left of a device with a higher x value.

In certain embodiments, device locations expressed as coordinates in the coordinate system may be converted to cell locations. For example, in the coordinate system of FIG. 4A, a device with a y=k may be in a cell that is under a cell with a device location y=k−1, and above a cell with a device location of y=k+1.

Modifications, additions, or omissions may be made to the systems and apparatuses disclosed herein without departing from the scope of the invention. The components of the systems and apparatuses may be integrated or separated. For example, camera 40 and image processor 42 may be integrated or separated. Moreover, the operations of the systems and apparatuses may be performed by more, fewer, or other components. For example, the operations of target detector 64 and code reader 66 may be performed by one component, or the operations of location engine 68 may be performed by more than one component. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

A component of the systems and apparatuses disclosed herein may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible media and may perform operations when executed by a computer. Certain logic, such as a processor (or processing unit), may manage the operation of a component. Examples of a processor include one or more computers, one or more microprocessors, one or more applications, and/or other logic.

In particular embodiments, the operations of the embodiments may be performed by one or more computer readable media encoded with a computer program, software, computer executable instructions, and/or instructions capable of being executed by a computer. In particular embodiments, the operations of the embodiments may be performed by one or more computer readable media storing, embodied with, and/or encoded with a computer program and/or having a stored and/or an encoded computer program.

A memory (or memory unit) stores information. A memory may comprise one or more non-transitory, tangible, computer-readable, and/or computer-executable storage media. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Components of the systems and apparatuses may be coupled by any suitable communication network. A communication network may comprise all or a portion of one or more of the following: a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of any of the preceding.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A system comprising:
   one or more interfaces operable to:
      receive one or more images of a computer rack;
   one or more memory units operable to:
      store the one or more images of the computer rack; and
   one or more processing units operable to:
      access a particular image of the one or more images;
      repeat the following for each of one or more device codes of the particular image to yield a device identifier-location association for each of the one or more device codes:
         locate a device code in the particular image;
         read a device identifier from the device code;
         determine a device location of a computing device based at least in part on the location of the device code in the particular image, the device location being a coordinate location of the device code in the particular image;
         associate the device identifier and the device location to yield a device identifier-location association; and
         store the device identifier-location association;
      access a template associated with the computer rack; and
      convert, based at least in part on the accessed template associated with the computer rack, a particular device location of a particular computing device from the coordinate location of the device code in the particular image to a location with respect to the computer rack.

2. The system of claim 1, wherein the location with respect to the computer rack comprises a spatial relationship between the location of the device code in the particular image and the location of the computer rack in the particular image.

3. The system of claim 1, wherein the particular image is accessed in response to a determination that a previously-accessed image of the one or more images is not satisfactory.

4. The system of claim 1, wherein the one or more processing modules are further operable to:
   receive a request for a requested device location associated with a given device identifier; and
   determine the requested device location from a device identifier-location association for the given device identifier.

5. The system of claim 1, the receiving the one or more images further comprising:
   receiving the one or more images from a camera operable to image the computer rack.

6. A computer-implemented method comprising:
   receiving one or more images of a container;
   accessing a particular image of the one or more images;
   repeating, using one or more processing units, the following for each of one or more device codes of the particular image to yield a device identifier-location association for each of the one or more device codes:
      locating a device code in the particular image;
      reading a device identifier from the device code;
      determining a device location based at least in part on the location of the device code in the particular image, the device location being a coordinate location of the device code in the particular image;
      associating the device identifier and the device location to yield a device identifier-location association; and
      storing the device identifier-location association;
   accessing a template associated with the container; and
   converting, based at least in part on the accessed template associated with the container, a particular device location of a particular computing device from the coordinate location of the device code in the particular image to a location with resect to the container.

7. The computer-implemented method of claim 6, further comprising:
   locating a container code in the particular image of the one or more images, wherein the template associated with the container is accessed based at least in part on the container code.

8. The computer-implemented method of claim 6, wherein the location with respect to the container comprises a spatial relationship between the location of the device code in the particular image and the location of the container in the particular image.

9. The computer-implemented method of claim 6,
wherein the location with respect to the container comprises a spatial relationship between the location of the device code in the particular image and the location of an origin device of the one or more devices in the particular image.

10. The computer-implemented method of claim 6,
wherein the location with respect to the container is expressed as one of a plurality of container cells of the container.

11. The computer-implemented method of claim 6, further comprising:
receiving a request for a requested device location associated with a given device identifier; and
determining the requested device location from a device identifier-location association for the given device identifier.

12. The computer-implemented method of claim 6,
wherein converting the particular device location of the particular computing device from the coordinate location of the device code in the particular image to a location with respect to the container is performed in response to a request for the particular device location associated with the device identifier of the particular computing device.

13. The computer-implemented method of claim 6, wherein the particular image is accessed in response to a determination that a previously-accessed image of the one or more images is not satisfactory.

14. The computer-implemented method of claim 6, the receiving the one or more images further comprising:
receiving the one or more images from a camera operable to image the container.

15. One or more non-transitory computer-readable media comprising logic, the logic when executed by one or more processing units operable to perform operations comprising:
accessing one or more images of a container;
locating the container in a particular image of the one or more images;
repeating the following for each of one or more device codes of the particular image to yield a device location for each of the one or more device codes:
locating a device code in the particular image;
determining a device location based at least in part on the location of the device code in the particular image, the device location being a coordinate location of the device code in the particular image;
converting, based at least in art on an accessed template associated with the container, the determined device location from the coordinate location of the device code in the particular image to a location with respect to the container; and
recording the one or more device locations.

16. The computer-readable media of claim 15, wherein the logic when executed by one or more processing units is further operable to:
associate a device identifier of each device and a device location of each device to yield one or more device identifier-location associations.

17. The computer-readable media of claim 15,
wherein the location with respect to the container comprises a spatial relationship between the location of the device code in the particular image and the location of the container in the particular image.

18. The computer-readable media of claim 15,
wherein the location with respect to the container comprises a spatial relationship between the location of the device code in the particular image and the location of an origin device of the one or more devices in the particular image.

19. The computer-readable media of claim 15,
wherein the location with respect to the container is expressed as one of a plurality of container cells of the container.

20. The computer-readable media of claim 15, wherein the logic when executed by one or more processing units is further operable to:
associate a device identifier of each device and a device location of each device to yield one or more device identifier-location associations; and
receive a request for a requested device location associated with a given device identifier; and
determine the requested device location from a device identifier-location association for the given device identifier.

21. The computer-readable media of claim 15,
wherein converting the particular device location of the particular computing device from the coordinate location of the device code in the particular image to a location with respect to the container is performed in response to a request for the particular device location associated with the device identifier of the particular computing device.

22. The computer-readable media of claim 15, wherein the particular image is accessed in response to a determination that a previously-accessed image of the one or more images is not satisfactory.

* * * * *

UNITED STATES PATENT AND TRADEMARK OFFICE
CERTIFICATE OF CORRECTION

| | | |
|---|---|---|
| PATENT NO. | : 8,622,284 B1 | Page 1 of 1 |
| APPLICATION NO. | : 12/976837 | |
| DATED | : January 7, 2014 | |
| INVENTOR(S) | : Zachary J. Hansen | |

It is certified that error appears in the above-identified patent and that said Letters Patent is hereby corrected as shown below:

In the Claims

Claim 6, Column 10, Line 56 that reads "a location with resect to the container." should read --a location with respect to the container.--.

Claim 15, Column 11, Line 48 that reads "converting, based at least in art on an accessed template" should read --converting, based at least in part on an accessed template--.

Signed and Sealed this
Third Day of June, 2014

Michelle K. Lee
*Deputy Director of the United States Patent and Trademark Office*